United States Patent
Zoller et al.

[11] Patent Number: 5,541,486
[45] Date of Patent: Jul. 30, 1996

[54] AUTOMATIC TUNING OF A POSITION CONTROL CIRCUIT FOR A SERVO DEVICE

[75] Inventors: Allan C. Zoller, Cleveland; Tina Vrabec, Mentor, both of Ohio; Richard A. Dolezal, Rochester Hills, Mich.

[73] Assignee: Elsag International N.V., Amsterdam, Netherlands

[21] Appl. No.: 326,892

[22] Filed: Oct. 21, 1994

[51] Int. Cl.[6] .................................................. G05B 5/01
[52] U.S. Cl. ........................................... 318/619; 318/611
[58] Field of Search .......................... 318/609–611, 619, 318/635, 638, 650, 652, 657, 677, 678, 681; 364/161, 162, 183, 184, 474.12, 163; 369/44.29, 44.35

[56] References Cited

U.S. PATENT DOCUMENTS

| | | | |
|---|---|---|---|
| 3,892,951 | 7/1975 | Stutz | 364/470 |
| 4,368,520 | 1/1983 | Hwang et al. | 318/657 |
| 4,878,211 | 10/1989 | Suzuki et al. | 318/640 |
| 4,920,305 | 4/1990 | Benson et al. | 318/657 |
| 4,999,557 | 3/1991 | Inoue | 318/611 X |
| 5,281,902 | 1/1994 | Edelen et al. | 318/632 |
| 5,334,923 | 8/1994 | Lorenz et al. | 318/805 |
| 5,369,345 | 11/1994 | Phan et al. | 318/610 X |
| 5,475,291 | 12/1995 | Yoshida et al. | 318/561 |

Primary Examiner—Jonathan Wysocki
Attorney, Agent, or Firm—Paul R. Katterle; Michael M. Rickin

[57] ABSTRACT

A position control circuit having a demodulator with automatic tuning capability for use in an electro-hydraulic positioning system used to position a servo device. The position control circuit includes the demodulator, an analog to digital converter with an input voltage range, and a microcontroller. The demodulator has a gain and is operable to convert a feedback signal from the servo device to a position signal having a lower voltage value when the servo device is at its 0% position and an upper voltage value when the servo device is at its 100% position; the lower voltage value and upper voltage values being a function of the demodulator gain. Upon operator initiation, the microcontroller automatically calculates the largest value for the demodulator gain that results in the position signal from the demodulator having a lower voltage value within a lower voltage range and an upper voltage value within an upper voltage range, where the lower voltage range and the upper voltage range are within the input voltage range of the analog to digital converter.

17 Claims, 6 Drawing Sheets

THIN FILM RESISTOR NETWORK

| INTEGER VALUES TRANSMITTED BY DEMODULATOR GAIN SIGNAL | REAL NUMBER VALUES OF DEMODULATOR GAIN |
|---|---|
| 0 | AUTOMATIC TUNING CYCLE INTIATED |
| 1 | 2.0 |
| 2 | 4.0 |
| 3 | 5.9 |
| 4 | 7.8 |
| 5 | 10.0 |
| 6 | 11.8 |
| 7 | 16.0 |
| 8 | 21.1 |
| 9 | 24.7 |
| 10 | 28.3 |
| 11 | 32.0 |
| 12 | 36.3 |
| 13 | 40.0 |
| 14 | 44.0 |
| 15 | 48.8 |
| 16 | 52.0 |
| 17 | 54.9 |
| 18 | 61.5 |
| 19 | 64.2 |
| 20 | 69.8 |
| 21 | 72.0 |
| 22 | 78.6 |
| 23 | 87.7 |
| 24 | 93.6 |
| 25 | 100.9 |
| 26 | 108.0 |
| 27 | 118.8 |
| 28 | 126.2 |
| 29 | 132.0 |
| 30 | 141.3 |
| 31 | 152.0 |

5,541,486

AUTOMATIC TUNING OF A POSITION CONTROL CIRCUIT FOR A SERVO DEVICE

FIELD OF THE INVENTION

This invention relates to electro-hydraulic positioning systems for servo devices and more particularly to a position control circuit having a demodulator that can be automatically tuned.

DESCRIPTION OF THE PRIOR ART

Electro-hydraulic positioning systems are used extensively for the positioning of servo devices requiring high thrust and rapid, accurate positioning. Electro-hydraulic positioning systems are usually comprised of an actuation circuit, a linear variable differential transformer (LVDT), and a position control circuit that is a component of a control system that controls the process incorporating the servo device(s). In a typical application, the desired position, or setpoint, for the servo device is calculated in a processing area of the control system external to the electro-hydraulic positioning system; said servo device setpoint being determined from the control requirements of the process as a whole. A process demand signal representative of the servo device setpoint is generated in the processing area of the control system and is transmitted to the electro-hydraulic positioning system which moves the servo device to the setpoint position.

A block diagram of a prior art electro-hydraulic positioning system is shown in FIG. 1 and is described in detail in U.S. Pat. No. 4,920,305 which discloses an electro-hydraulic positioning system with automatic calibration capabilities.

The actuation circuit 16 is comprised of a hydraulic fluid system 37, an electro-hydraulic pilot valve 36, and an actuator 38. The position of the servo device 40 is driven by the movement of the actuator 38 which is governed by the provision of high pressure fluid from the hydraulic fluid system 37. The flow of the high pressure hydraulic fluid is regulated by the electro-hydraulic pilot valve 36 which has coils 34 that are actuated by a control signal from the position control circuit 14.

The position control circuit 14 is comprised of a difference unit 60, a controller 62, a demodulator 46, a digital to analog converter 58, a microcontroller 32, and an analog to digital converter 48. The position control circuit 14 is mounted on a single input/output (I/O) plug-in printed circuit card to facilitate replacement. The I/O card interfaces with the rest of the control system through a parallel communication bus 54. The primary component of the position control circuit 14 is the controller 62 which utilizes the difference between the position of the driven device 40 and the servo device setpoint to calculate the control signal.

The position of the actuator 38, and, thus, the position of the servo device, is measured by the LVDT 42. As is well known, the LVDT 42 has a primary winding 42a, which receives a sinusoidal excitage signal, and two secondary windings 42b and 42c The LVDT 42 also has an iron core 42d connected to the actuator 38. As the position of the actuator 38 changes, there is a corresponding change in position of the iron core 42d. The amplitudes of the sinusoidal signals from the two secondary windings 42b and 42c depend upon the position of the iron core 42d; the amplitudes of the two sinusoidal signals being equal when the iron core 42d is centered. As the iron core 42d moves from the center, the amplitudes of the sinusoidal signals from the secondary windings 42b and 42c change by different amounts. The demodulator 46, which is connected to the secondary windings 42b and 42c, utilizes this difference in the amplitudes of the sinusoidal signals to generate the analog position signal that is representative of the position of the actuator 38 and, thus, the position of the servo device 40. The demodulator 46 has a gain (not shown) whose value affects the voltage range of the analog position signal.

The analog position signal from the demodulator 46 is converted to a digital position signal in the analog to digital converter 48. Typically, analog to digital converters have a set input voltage range such as −10 volts to +10 volts or −4.5 volts to +4.5 volts. Accordingly, it is desirable to maintain the analog position signal from the demodulator 46 within the input voltage range of the analog to digital converter 48.

After the analog position signal from the demodulator 46 is digitized in the analog to digital converter 48, the resulting digital position signal is transmitted to the microcontroller 32. The microcontroller 32 receives the digital position signal as well as the process demand signal and output feedback signals which are feedback signals from the control signal to the electro-hydraulic pilot valve coils 34 digitized in the analog to digital converter 48. The microcontroller 32 provides for automatic system fault detection by monitoring these signals and reporting to the multifunction processor 52 when the signals are outside certain parameters. In addition, the microcontroller 32 calculates a digital demand signal from the process demand signal.

The digital demand signal from the microcontroller 32 is transmitted to the digital to analog converter 58 where it is converted to an analog demand signal. From there, the analog demand signal is transmitted to the difference unit 60. The difference unit 60 receives both the analog demand signal and the analog position signal from the demodulator 46. The difference unit 60 subtracts the analog position signal from the analog demand signal and sends the resulting error signal to the controller 62. The controller 62 calculates the control signal by applying the well-known proportional plus integral plus derivative control algorithm to the error signal. The proportional component, integral component, and derivative component of the controller 62 each have a gain whose value changes the effect of the component on the error signal.

Since the characteristics of the electro-hydraulic pilot valve 36, LVDT 42, and servo device 40 differ from application to application, the position control circuit 14 needs to be modified or "tuned" for each new application so as to provide optimal control of the servo device 40. One of the steps required to tune the position control circuit 14 is to tune the demodulator gain so as to align the voltage range of the analog position signal from the demodulator 46 with the input voltage range of the analog to digital converter 48.

Currently, the tuning of the demodulator gain is a time-consuming, manual, trial and error procedure. Typically, the position control circuit 14 is located in a control room a considerable distance away from the process where the servo device 40 is located. The demodulator gain is tuned by having an operator walk out to the process and move the servo device 40 to the fully closed position (0%). The operator must then walk back to the control room and manually measure the voltage of the analog position signal from the demodulator 46. The operator then adjusts the demodulator gain until the voltage is measured to be at or near the lower limit of the input voltage range of the analog to digital converter 48. The operator must then walk back out to the process and move the servo device 40 to the fully open position (100%). The operator must again walk back to the control room and measure the voltage of the analog position signal. The demodulator gain is then manually adjusted by the operator until the voltage is measured to be at or near the upper limit of the input voltage range of the analog to digital converter 48. Based upon the demodulator gain values for the fully closed and fully open positions, a gain value is chosen that yields a voltage range for the analog position signal that is close to the input voltage range of the analog to digital converter 48.

If the demodulator gain is adjusted by switches, the I/O card containing the demodulator 46 must be removed during the tuning process. In order to tune the demodulator gain, the I/O card must be removed and reinstalled for each change that is made to the demodulator gain. Thus, the I/O card will be handled repeatedly which could result in damage to the I/O card. The use of potentiometers to adjust the demodulator gain reduces the handling of the I/O card, but potentiometers are subject to contamination and drift over time which deteriorates their accuracy.

For the foregoing reasons, it is desirable to have a position control circuit having a demodulator that can be tuned without manually moving the servo valve and without using switches or potentiometers and without having to remove the I/O card. The position control circuit of the present invention meets this requirement.

SUMMARY OF THE INVENTION

The present invention describes a position control circuit for positioning a servo device. The servo device is connected to an actuation circuit and a position detection means that generates a servo device position signal. The control circuit operates in response to a process demand signal and has automatic demodulator tuning. The position control circuit comprises a demodulator having a gain, an analog to digital converter and an optimum means.

The demodulator receives the servo device position signal and calculates an analog position signal from it. The analog position signal has a lower voltage value when the servo device is at its 0% mechanical position and an upper voltage value when the servo device is at its 100% mechanical position. The lower voltage value and upper voltage value of the analog position signal are functions of the gain. The analog to digital converter, which has an input voltage range, converts the analog position signal to a digital position signal.

The optimum means sets the gain to an optimum value which results in the lower voltage value of the analog position signal being within a lower voltage range and the upper voltage value of the analog position signal being within an upper voltage range. Both the lower voltage range and the upper voltage range are within the input voltage range of the analog to digital converter.

DESCRIPTION OF THE DRAWINGS

The features, aspects, and advantages of the present invention will become better understood with regard to the following description, appended claims, and accompanying drawings where:

DESCRIPTION OF THE PREFERRED EMBODIMENT(S)

Figure 1:
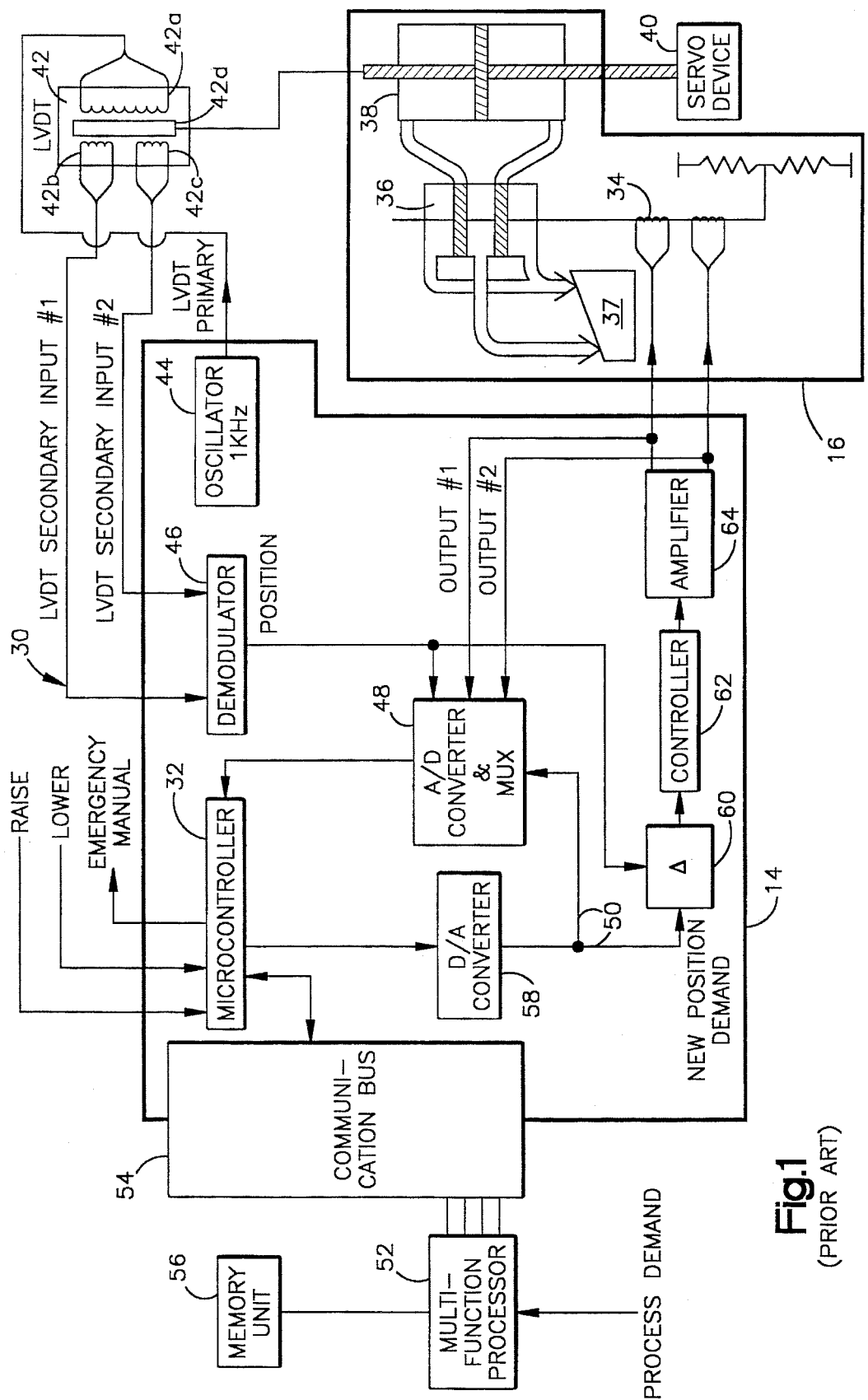
FIG. 1 shows a block diagram of a prior art electro-hydraulic positioning system used to position a servo device.
Figure 2:
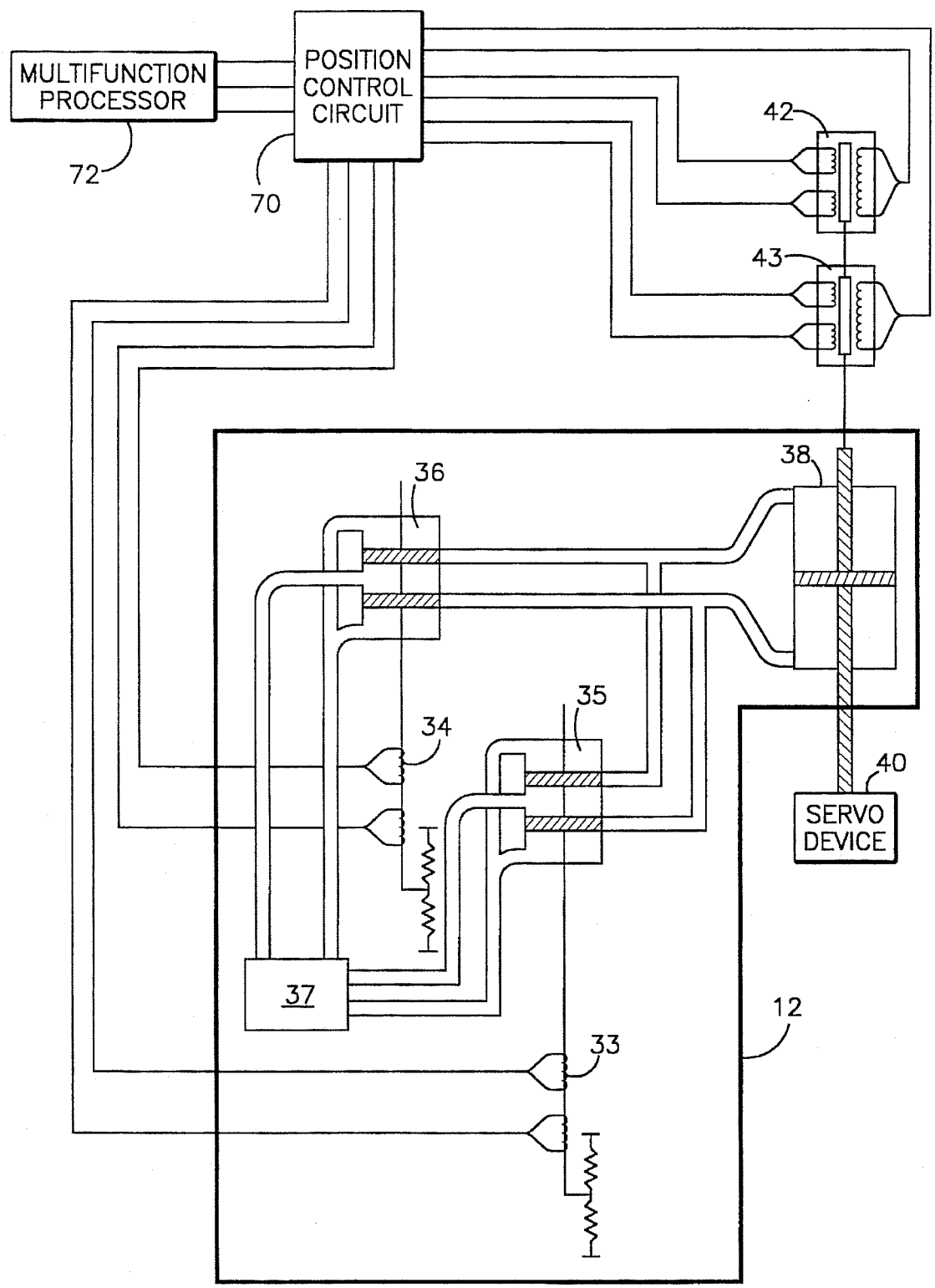
FIG. 2 shows a simplified block diagram of an electro-hydraulic positioning system containing a position control circuit embodied in accordance with the present invention.

Referring now to FIG. 2, there is shown a simplified block diagram for an electro-hydraulic positioning system containing a position control circuit 70 embodied in accordance with the present invention. In addition to containing the position control circuit 70, the electro-hydraulic positioning system contains an actuation circuit 12 and a pair of redundant LVDTs 42 and 43. The actuation circuit 12 contains a pair of redundant electro-hydraulic pilot valves 35 and 36, a hydraulic fluid system 37, and an actuator 38.

The electro-hydraulic positioning system positions a servo device 40 that is an element of a process being controlled by a distributed control system containing a multifunction processor 72. The position control circuit 70 is a component of the distributed control system and is resident on a single input/output (I/O) plug-in printed circuit card.

Figure 3:
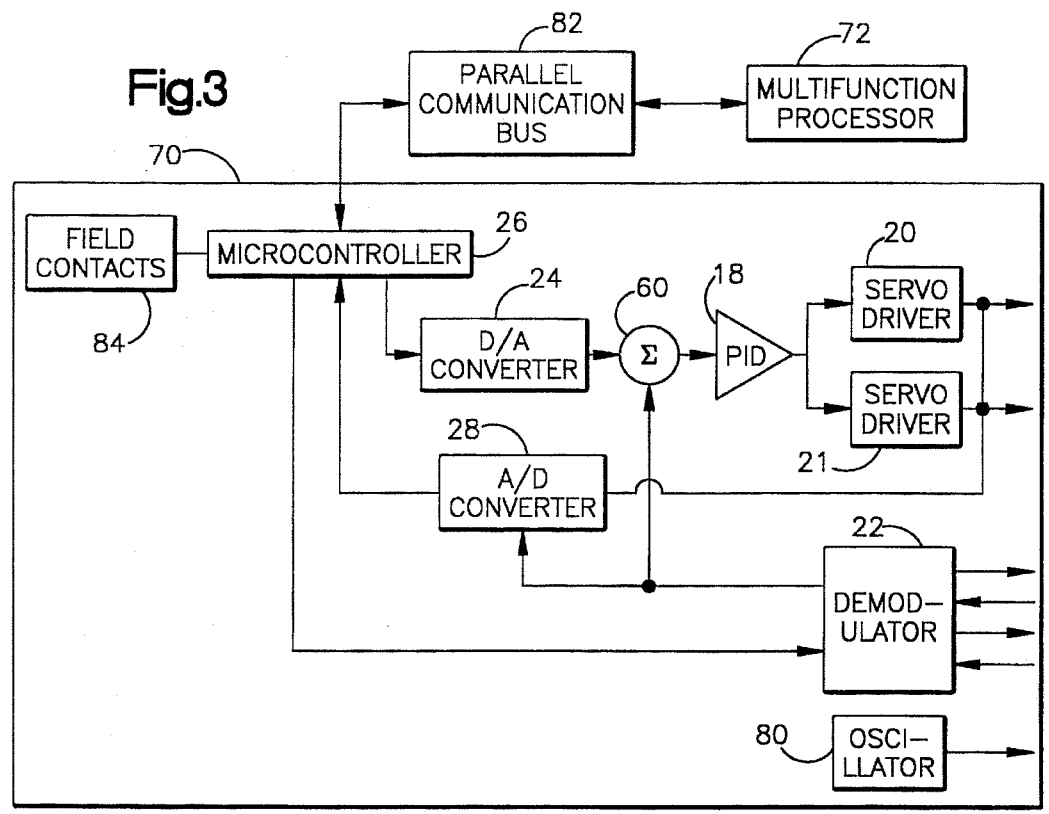
FIG. 3 shows a block diagram of the position control circuit embodied in accordance with the present invention.

Referring now to FIG. 3, there is shown a block diagram for the position control circuit 70. The position control circuit 70 is comprised of a difference unit 60, a controller 18, two servo drivers 20 and 21, a demodulator 22, a digital to analog converter 24, a microcontroller 26, an analog to digital converter 28, an oscillator 80, and field contacts 84.

The position control circuit 70 interfaces with the multifunction processor 72 in the distributed control system through a parallel communication bus 82. The multifunction processor 72 configures the position control circuit 70 so as to permit the position control circuit 70 to interface with the actuation circuit 12 (shown in FIG. 2) and redundant LVDTs 42 and 43 (shown in FIG. 2) as well as to communicate with the rest of the distributed control system. The configuration of the position control circuit 70 is accomplished through a control algorithm resident in the read only firmware of the multifunction processor 72. One example of such an algorithm is function code 55 contained in the multifunction processor sold by assignee's related entity, the Bailey Controls Company, hereinafter referred to as "Bailey".

In addition to configuring the position control circuit 70, the multifunction processor 72 also transmits a process demand signal to the position control circuit 70 over the parallel communication bus 82. The multifunction processor 72 calculates the process demand signal from the requirements of the process as a whole. The microcontroller 26 receives and responds to the process demand signal to generate a digital demand signal that is transmitted to the digital to analog converter 24 where it is converted to an analog demand signal. The analog demand signal, in turn, is transmitted to the difference unit 60 where it is compared to the position of the servo device 40 (shown in FIG. 2) to generate an error signal. The error signal is transmitted to the controller 18, which uses the error signal to calculate a control signal that is output by the two servo drivers 20 and 21 to the actuation circuit 12 (shown in FIG. 2).

One of the redundant electro-hydraulic pilot valves 35 and 36 (shown in FIG.2) in the actuation circuit 12 (shown in FIG.2) is designated as primary and the other is designated as secondary. The coils of the primary electro-hydraulic pilot valve receive the control signal from the servo driver designated as being primary, causing the primary electro-hydraulic pilot valve to move. The movement of the primary electro-hydraulic pilot valve regulates the flow of high pressure fluid to the actuator 38 (shown in FIG. 2), causing the actuator 38 to move in response thereto. The movement of the actuator 38, in turn, drives the servo device 40 (shown in FIG. 2) towards the requested setpoint position.

The position of the servo device 40 is measured by the two redundant LVDTs 42 and 43 (shown in FIG. 2) connected to the servo device 40. The microcontroller 26 configures the interface between the position control circuit 70 and the redundant LVDTs 42 and 43 based upon the value of a parameter in the control algorithm in the multifunction processor 72 that is transmitted to the microcontroller 26 over the parallel communication bus 82. A value is entered in the parameter that will designate one of the two redundant LVDTs 42 and 43 as active and one as back-up. It should be noted that other values can be entered in the parameter to change the designation of the redundant LVDTs 42 and 43 or configure the interface for only one of the redundant LVDTs 42 and 43.

The excitation signals for the primary windings of the redundant LVDTs 42 and 43 (shown in FIG.2) are generated by the oscillator 80. The frequency of the oscillator 80 is digitally programmed by the microcontroller 26 based upon the value of a parameter in the control algorithm in the multifunction processor 72 that is transmitted to the microcontroller 26 over the parallel communication bus 82. The frequency range of the oscillator 80 is 400 Hz to 15 KHz. The amplitudes of the excitation signals are determined by switches (not shown) in the position control circuit 70 and range between 1.05 $V_{peak}$ to 9 $V_{peak}$. It should be appreciated that the ability to change the frequency and voltage amplitude of the oscillator 80 output to the primary windings of the redundant LVDTs 42 and 43 (shown in FIG. 2) enables the position control circuit 70 to interface with various types of LVDTs as well as other position detection devices such as Rotary Variable Differential Transformers (RVDTs) and Linear Variable Reluctance Transformers (LVRTs).

As the servo device 40 (shown in FIG. 2) moves, each LVDT generates a pair of sinusoidal signals from its secondary windings. The demodulator 22 in the position control circuit 70 is connected to the secondary windings of the two LVDTs 42 and 43 (shown in FIG. 2), enabling the demodulator 22 to receive the two pairs of sinusoidal signals. The amplitudes of the sinusoidal signals within each pair vary as the servo device 40 moves towards the requested setpoint position. The demodulator 22 utilizes this difference in the amplitude of the sinusoidal signals of the active LVDT to generate an analog position signal representative of the position of the servo device 40. The analog position signal has a voltage range defined by a lower voltage value when the servo device 40 is at its 0% mechanical position and an upper voltage value when the servo device 40 is at its 100% mechanical position.

The demodulator 22 contains an overflow detection circuit (not shown) that generates an LVDT status signal that is transmitted to the microcontroller 26. If there is a loss of voltage at the secondary winding of the active LVDT, the overflow detection circuit disables the operation of the demodulator 22 and sets the value of the LVDT status signal to "bad". The microcontroller 26 monitors the LVDT status signal for "bad" quality. If the microcontroller 26 detects "bad" quality, the sinusoidal signals from the backup LVDT are used to generate the analog position signal.

The operation of the demodulator 22 can be bypassed using jumpers in the position control circuit 12 so that a 4–20 mA or ±10 V signal may be directly input into the position control circuit 70 as the analog position signal. This feature permits the position control circuit 70 to interface with a DC LVDT which has electronic components that condition the sinusoidal signals from the secondary winding of the LVDT.

Figure 5:
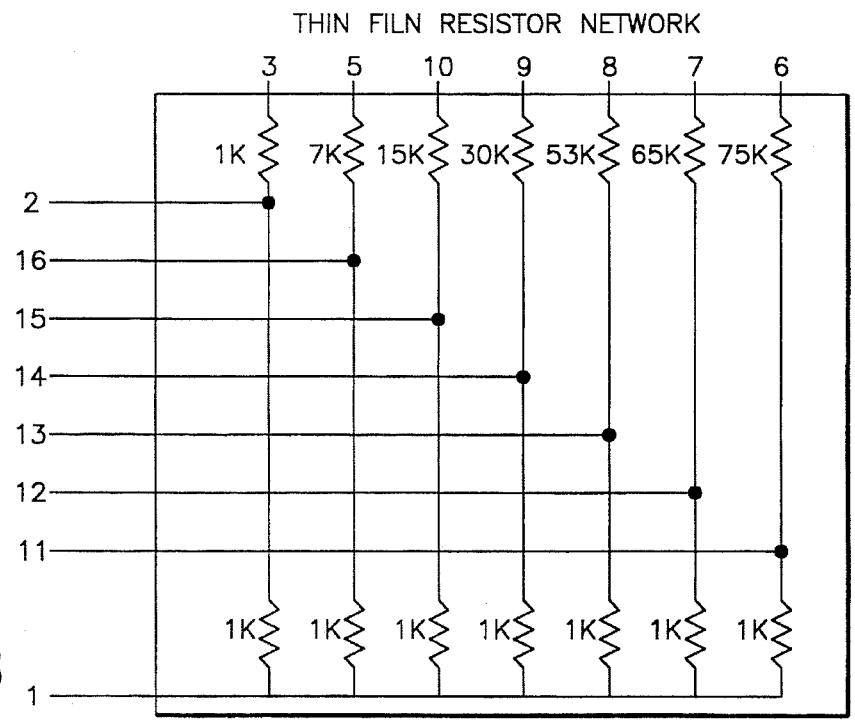
FIG. 5 shows an elementary schematic for the thin film resistor network used for the demodulator gain and the controller gain in the position control circuit embodied in accordance with the present invention.

The analog to digital converter 28 has an input voltage range of −4.5 volts to +4.5 volts. Accordingly, the demodulator 22 maintains the voltage range of the analog position signal within a range of −4.5 volts to +4.5 volts. In the demodulator 22, the voltage range of the analog position signal is adjusted through a demodulator gain (not shown). The demodulator gain is comprised of a thin film resistor network chip whose resistance value is configured by setting silicon switches connected to the chip through a serially encoded demodulator gain signal received from the microcontroller 26. Thin film resistor networks are well known in the electronics industry and can be obtained from various manufacturers. The thin film resistor networks used in the current invention are custom parts manufactured by Electro-Films Inc. having offices in Warwick, R.I., West Hurley, N.Y., and Ashford, Middlesex, United Kingdom. An elementary schematic for the thin film resistor networks used in the current invention is shown in FIG. 5.

The microcontroller 26, which is a 16-bit data bus microcontroller, operating at 16 MHz and having 16 Mbyte of address space, performs many functions in addition to the generation of the demodulator gain signal and monitoring of the LVDT status signal. The microcontroller 26 calibrates and tunes the position control circuit 70, provides automatic fault detection, configures the servo drivers 20 and 21, and generates the digital demand signal. The microcontroller 26 generates the demodulator gain signal while tuning the position control circuit 70.

The microcontroller 26 automatically calibrates the position control circuit 70 upon receipt of a calibration signal from the multifunction processor 72 over the parallel communication bus 82. During the calibration cycle, the microcontroller 26 increases the digital demand signal from its current value until the servo device 40 (shown in FIG. 2.) reaches its 100% mechanical limit. When the servo device 40 reaches its 100% limit, the value of the digital position signal, LVDT100, is transmitted to the multifunction processor 72 where it is stored in non-volatile memory. Next, the microcontroller 26 decreases the digital demand signal until the servo device 40 reaches its 0% limit. When the servo device 40 reaches its 0% limit, the value of the digital position signal, LVDT0, is transmitted to the multifunction processor 72 where it is stored in non-volatile memory.

Using the foregoing values of LVDT100 and LVDT0 obtained during the calibration cycle, the microcontroller 26 calculates the digital demand signal from the process demand signal as follows:

digital demand signal =

$$\frac{(\text{process demand signal})}{100} (LVDT100 - LVDT0) + LVDT0$$

The microcontroller 26 determines the 0% and 100% mechanical limits of the servo device 40 (shown in FIG. 2) from output feedback signals, which are feedback signals from the servo driver outputs 20 and 21 that have been digitized in the analog to digital converter 28. The microcontroller 26 monitors the output feedback signals representative of the voltage of the negative sides of the servo outputs 20 and 21. If the voltage of the negative side of a servo output is below −1 volts when the control signal from the servo output is requesting that the servo device 40 (shown in FIG.2) move to its 100% mechanical position, the microcontroller 26 considers the current through the coils of the electro-hydraulic pilot valves 33 and 34 (shown in FIG. 2) to be saturated, and, thus, the servo device 40 to be at its 100% mechanical limit. If the voltage of the negative side of a servo output is above +1 volts when the control signal from the servo output is requesting that the servo device 40 move to its 0% mechanical position, the microcontroller 26 considers the current through the coils of the electro-hydraulic pilot valves 33 and 34 to be saturated, and, thus, the servo device 40 to be at its 0% mechanical limit.

The microcontroller 26 also uses the output feedback signals to monitor for system faults. If the output feedback signal representative of the voltage of the negative side of a servo output is read as being near zero volts and the output feedback signal representative of the voltage of the positive side of the servo output is read as being above 9.6 volts, then the microcontroller 26 considers the servo output to have an open circuit. The microcontroller 26 determines that a servo output has a short circuit if either of the following events occur:

(i) the output feedback signal representative of the voltage across the coils of the associated electro-hydraulic pilot valve is within 500 mV of zero volts and the output feedback signal representative of the voltage of the negative side of the servo output is greater than 1.5 volts; or (ii) the difference between the output feedback signals representative of the voltages across the coils of the two electro-hydraulic pilot valves is greater that 100 mV and the output feedback signal representative of the voltage across the coils of the associated electro-hydraulic pilot valve is within 115 mV of zero volts.

The microcontroller 26 configures the outputs of the two servo drivers 20 and 21 based upon a parameter in the control algorithm in the multifunction processor 72 that is transmitted to the microcontroller 26 over the parallel communication bus 82. Depending upon the value of the parameter, the microcontroller 26 can configure one or both of the servo drivers 20 and 21 to output the control signal, or can configure one servo driver to output the control signal to the primary electro-hydraulic pilot valve and one servo driver to output a −20% signal to the secondary electro-hydraulic pilot valve, forcing it closed.

The control signal output from the servo drivers 20 and 21 is ultimately derived from the digital demand signal which is generated by the microcontroller 26. The microcontroller 26 calculates the digital demand signal from the process demand signal and the calibration parameters LVDT0 and LVDT100 as described earlier unless the microcontroller 26 is calibrating or tuning the position control circuit 70 or the position control circuit 70 is placed in a manual mode of operation. The position control circuit 70 is placed in a manual mode of operation upon start-up, or upon a failure in the multifunction processor 72, or upon the microcontroller's receipt over the parallel communication bus 82 of a manual signal from a parameter in the control algorithm in the multifunction processor 72. In the manual mode of operation, the digital demand signal can be raised and lowered using field contacts 84 connected to the microcontroller 26.

The digital demand signal is converted to the analog demand signal in the digital to analog converter 24. The analog demand signal is transmitted to, and received by the difference unit 60, which also receives the analog position signal from the demodulator 22. The difference unit 60 subtracts the analog position signal from the analog demand signal thereby generating the error signal. The controller 18 calculates the value for the control output by applying the well known proportional plus integral plus derivative control algorithm to the error signal. The controller 18 is a hardware device that has three components, a proportional component, an integral component, and a derivative component. Each component has a gain whose value changes the effect of the component on the error signal. The gains for the three components are comprised of the thin film resistor network chips described earlier. The integral and derivative gains of the controller 18 are not tunable. However, the proportional gain of the controller 18 can be tuned by changing the resistance of its thin film resistor network chip. The resistance of the proportional gain thin film resistor network chip can be changed by selecting silicon switches connected to the chip through a serially encoded proportional gain signal received from the microcontroller 26.

The selection of the optimum value for the demodulator gain through the use of the demodulator gain signal can be performed manually or by an automatic tuning cycle. The value for the demodulator gain signal can be selected manually using hardware switches (not shown) in the position control circuit 70 or by using a demodulator gain parameter in the control algorithm. In the latter method, the value is manually entered into the multifunction processor 72 by an operator through an operator interface device within the control system. Specifically, the operator enters an integer value into the demodulator gain parameter in the control algorithm in the multifunction processor 72. The integer value entered in the demodulator gain parameter can range from a low gain value, DGl, to a high gain value, DGh. The integer value corresponds to a series of settings for the silicon switches connected to the demodulator gain thin film resistor network chip, which, when implemented, yield a specific real number value for the demodulator gain. A table showing the integer values that can be entered into the demodulator gain parameter and the real number values of the demodulator gain corresponding thereto is shown in FIG. 6. Referring now to FIG.6, the integer values entered in the demodulator gain parameter range from 1 for DGl to 31 for DGh and represent real number values for the demodulator gain ranging from 2.0 to 152.0. The entry of a 0 will initiate the automatic tuning cycle.

The entry of the integer value for the demodulator gain in the demodulator gain parameter can be accomplished by the operator while the multifunction processor 72 is normally functioning and communicating with the rest of the control system, i.e., while the multifunction processor is "on line". The integer value is transmitted to the microcontroller over the parallel communication bus 82. The microcontroller 26 converts the integer value into a series of settings for the silicon switches connected to the demodulator gain thin film resistor network chip and serially encodes these settings into the demodulator gain signal. The microcontroller 26 then transmits the demodulator gain signal to the demodulator 22.

The selection of an optimum value for the proportional gain through the use of the proportional gain signal can only be performed manually. As with the demodulator gain, an integer value for the proportional gain is manually entered into the multifunction processor 72 by an operator through an operator interface device within the control system. The integer value is transmitted to the microcontroller 26 over the parallel communication bus 82. The microcontroller 26 converts the integer value into a series of settings for the silicon switches connected to the proportional gain thin film resistor network chip and serially encodes these settings into the proportional gain signal. The microcontroller 26 then transmits the proportional gain signal to the proportional gain in the controller 18.

The automatic tuning cycle for the demodulator gain is initiated by a start tune signal that is generated in the multifunction processor 72 when the demodulator gain parameter is 0. The start tune signal is transmitted from the multifunction processor 72 to the microcontroller 26 over the parallel communication bus 82. As stated earlier, the demodulator gain parameter can be changed by an operator through an operator interface device in the control system while the multifunction processor 72 is on-line.

During the automatic tuning cycle, the microcontroller 26 calculates the optimum value for the demodulator gain. In order to simplify calculations and facilitate data interpretation, the microcontroller 26 scales the voltage range of the analog position signal up from its actual range of −4.5 volts to +4.5 volts to a range of −10 volts to +10 volts. The optimum value for the demodulator gain is calculated using the scaled voltage values and is the value of the demodulator gain that results in the lower voltage value of the analog position signal being within a lower voltage range and the upper voltage value of the analog position signal being within an upper voltage range. The lower voltage range begins with, but does not include, a minimum lower voltage value, LVmin, and extends to, and includes, a maximum lower voltage value, Vl. The upper voltage range begins with, but does not include, a minimum upper voltage value, UVmin, and extends to, and includes, a maximum upper voltage value, Vh.

Vl has an actual value of −3.825 volts which corresponds to a scaled value of −8.5 volts while Vh has an actual value of +3.825 volts which corresponds to a scaled value of +8.5 volts. LVmin has an actual value of −2.25 volts corresponding to a scaled value of −5 volts and UVmin has an actual value of +2.25 volts corresponding to a scaled value of +5 volts.

An actual voltage range of −3.825 volts to +3.825 volts (corresponding to a scaled voltage range of −8.5 volts to 8.5 volts) is chosen for the analog position signal because it permits some overshoot down to an actual value of −4.5 volts (corresponding to a scaled value of −10 volts) or up to an actual value of +4.5 volts (corresponding to a scaled value of +10 volts) in the event of a voltage drift, but is still large enough to maintain the resolution of the signal. The voltage of the analog position signal is read by the microcontroller 26 through the digital position signal, i.e., the microcontroller 26 reads the voltage of the digital position signal as being the voltage of the analog position signal.

Figure 4A:
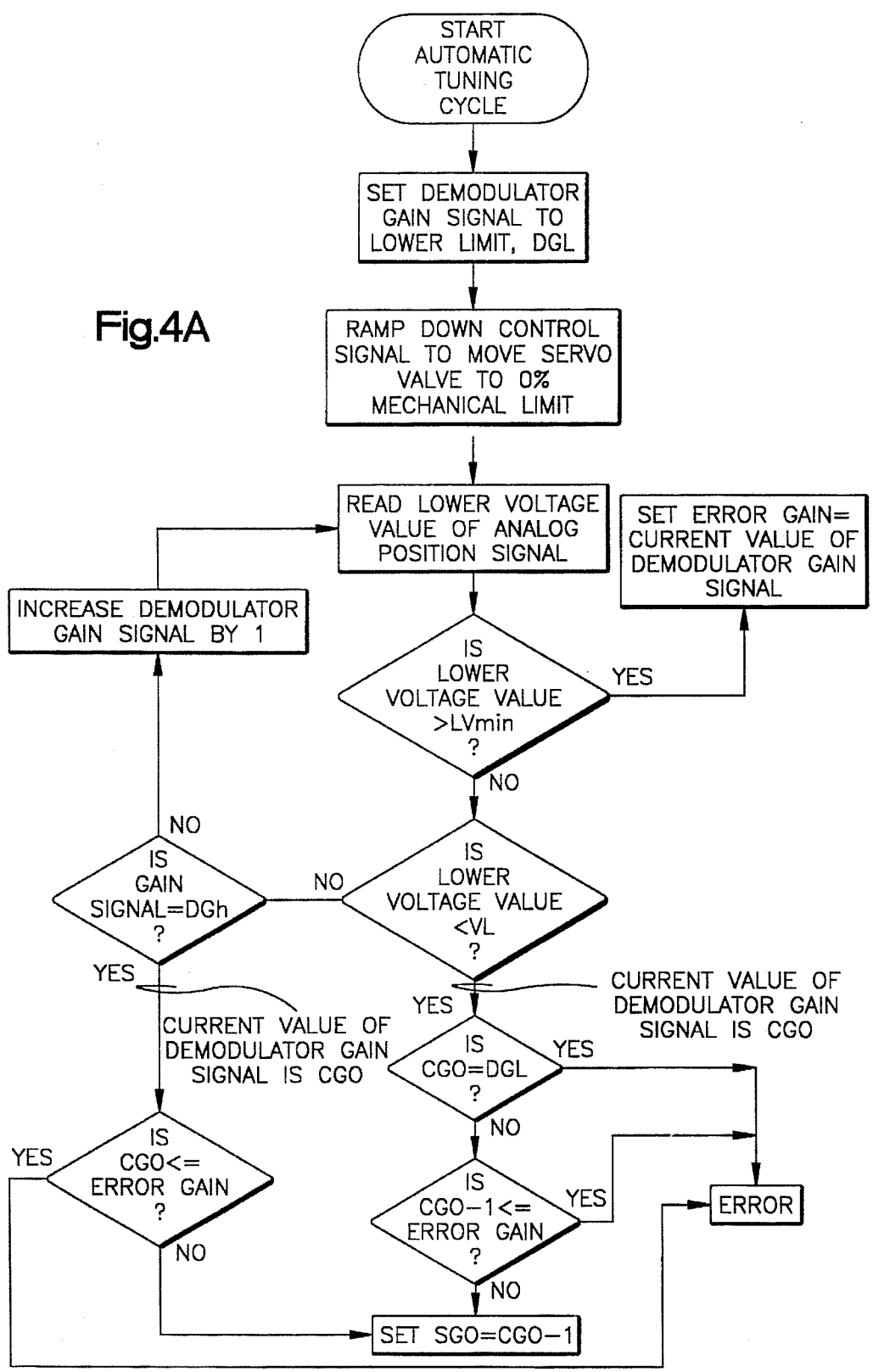
FIG. 4a–4c shows a flow diagram of the automatic tuning cycle of the position control circuit embodied in accordance with the present invention wherein the microcontroller calculates the optimum value for the demodulator gain.
Figure 4B:
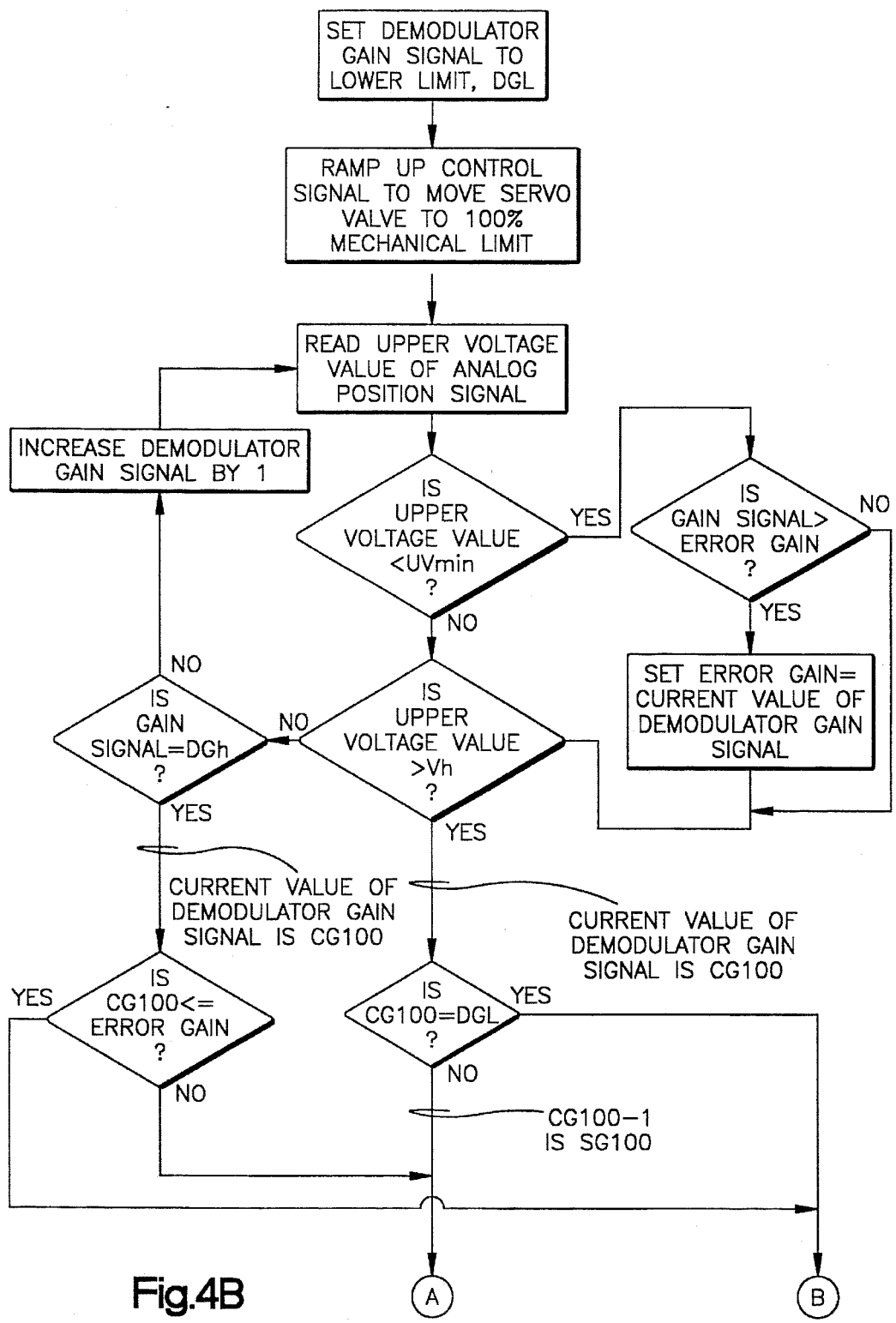
Figures 4C, 6:
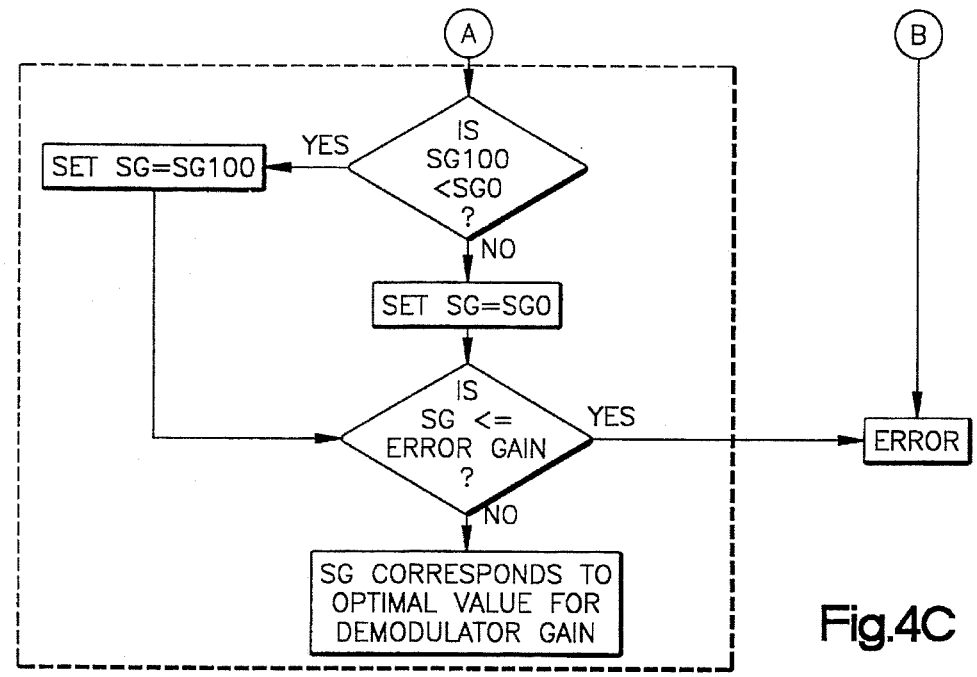
FIG. 6 shows a table of real number values of the demodulator gain corresponding to the integer values transmitted by the demodulator gain signal.

Referring now to FIGS. 4a to 4c there is shown a flow diagram 200 of a set of instructions contained in the read only memory of microcontroller 26 that implements the automatic tuning cycle of the present invention. Step 202 shown in FIG. 4A and steps 204 and 206 shown in FIG. 4B is that part of the position control circuit 70 (shown in FIG. 3) that calculates the optimum value for the demodulator gain. As will be shown in more detail below:

a. step 202 calculates a first select gain, SG0, which is the largest value of the demodulator gain signal that results in the lower voltage value of the analog position signal being within the lower voltage range;

b. step 204 calculates a second select gain, SG100, which is the largest value of the demodulator gain signal that results in the upper voltage value of the analog position signal being within the upper voltage range; and c. step 206 calculates an integer value, SG, for the demodulator gain signal which corresponds to the optimum value for the demodulator gain. SG is selected from SG0 and SG100, where SG100 is selected if SG100 is less than SG0 and SG0 is selected if SG0 is less than or equal to SG100, provided SG does not result in the lower voltage value of the analog position signal being greater than LVmin or the upper voltage value of the analog position signal being less than UVmin.

Upon receipt of the start tune signal, Step 202 sets the integer value of the demodulator gain signal equal to the low demodulator gain, DGl. Next, step 202 decreases the digital demand signal, and, thus, the control signal until the servo device 40 (shown in FIG.2) reaches its 0% mechanical position. The microcontroller 26 determines the 0% and 100% mechanical limits of the servo device 40 from the output feedback signals representative of the voltage of the negative sides of the servo outputs 20 and 21 (shown in FIG.3) in the same manner as in the calibration cycle. Step 202 waits several seconds to enable the servo device 40 to settle and then enters a first increase loop wherein step 202 reads the lower voltage value of the analog position signal (through the digital position signal) and compares it to Vl. If the lower voltage value is greater than or equal to Vl and the demodulator gain signal is less than DGH, step 202 increases the demodulator gain signal by 1. Step 202 continues until either the lower voltage value of the analog position signal is less than Vl or the integer value of the demodulator gain signal equals DGh; step 202 reading the lower voltage value of the analog position signal and comparing it to Vl after each said demodulator gain signal increase. The integer value of the demodulator gain signal when step 202 exits the first increase loop is designated as CG0.

During the first increase loop, step 202 checks the lower voltage value of the analog position signal (through the digital position signal) after each demodulator gain signal increase to determine if the lower voltage value of the analog position signal is greater than LVmin. When the lower voltage value of the analog position signal exceeds LVmin, step 202 sets an error gain equal to the then current integer value of the demodulator gain signal. Thus, when step 202 exits the first increase means, the error gain will be the largest integer value of the demodulator gain signal which results in the lower voltage value of the analog position signal exceeding LVmin.

After exiting the first increase loop, step 202 either calculates SG0, or determines that an error has occurred. If step 202 exits the first increase loop because CG0 equals DGh, step 202 determines that an error has occurred if CG0 is less than or equal to the error gain. If step 202 exits the first increase loop because the lower voltage value of the analog position signal is less than Vl, step 202 determines that an error has occurred if CG0 is equal to DGl or if CG0 −1 is less than or equal to the error gain. If step 202 determines that an error has occurred, step 202 generates an error signal and transmits it to the multifunction processor 72 (shown in FIG. 3) over the parallel communication bus 82 (shown in FIG.3). If step 202 does not determine that an error has occurred, step 202 sets SG0 equal to CG0 −1 and the automatic tuning cycle proceeds to step 204.

Step 204 begins by setting the integer value of the demodulator gain signal equal to DGl. Next, step 204 increases the digital demand signal, and, thus, the control signal, until the servo device 40 (shown in FIG. 2) reaches its 100% mechanical position. Step 204 waits several seconds to enable the servo device 40 to settle and then enters a second increase loop wherein step 204 reads the upper voltage value of the analog position signal (through the digital position signal) and compares it to Vh. If the upper voltage value is less than or equal to Vh and the demodulator gain signal is less than DGh, step 204 increases the demodulator gain signal by 1. Step 204 continues until either the upper voltage value of the analog position signal is greater than Vh or the integer value of the demodulator gain signal equals DGh; step 204 reading the upper voltage value of the analog position signal and comparing it to Vh after each said demodulator gain signal increase. The integer value of the demodulator gain signal when step 204 exits the second increase loop is designated as CG100.

During the second increase loop, step 204 checks the upper voltage value of the analog position signal (through the digital position signal) after each demodulator gain signal increase to determine if the upper voltage value of the analog position signal is less than UVmin. When the upper voltage value of the analog position signal drops below UVmin and the then current integer value of the demodulator gain signal is greater than the error gain, step 204 sets the error gain equal to the then current integer value of the demodulator gain signal. Thus, when step 204 exits the second increase means, the error gain will be the greater of: (i) the largest integer value of the demodulator gain signal which results in the lower voltage value of the analog position signal being greater than LVmin, and (ii) the largest integer value of the demodulator gain signal which results in the upper voltage value of the analog position signal being less than UVmin.

After exiting the second increase loop, step 204 either calculates SG100 or determines that an error has occurred. If step 204 exits the second increase loop because CG100 equals DGh and CG100 is less than or equal to the error gain, step 204 determines that an error has occurred. If step 204 exits the second increase loop because the upper voltage value of the digital position signal is greater than Vh and CG100 is equal to DGl, step 204 once again determines that an error has occurred. If step 204 determines that an error has occurred, step 204 generates an error signal and transmits it to the multifunction processor 72 (shown in FIG. 3) over the parallel communication bus 82 (shown in FIG. 3). If step 204 does not determine that an error has occurred, CG100 −1 is designated as SG100 and the automatic tuning cycle proceeds to step 206.

Step 206 calculates SG which is the integer value of the demodulator gain signal corresponding to the optimum value for the demodulator gain. Step 206 selects SG from SG0 and SG100. SG100 is selected if SG100 is less than SG0 and SG0 is selected if SG0 is less than or equal to SG100, provided SG is not less than or equal to the error gain. If SG is less than or equal to the error gain, step 206 determines that an error has occurred. If step 206 determines that an error has occurred, step 206 generates an error signal and transmits it to the multifunction processor 72 (shown in FIG. 3) over the parallel communication bus 82 (shown in FIG. 3).

After calculating SG, the microcontroller 26 (shown in FIG. 3) transmits SG over the parallel communication bus 82 to the multifunction processor 72 where it is stored in non-volatile memory, enabling the multifunction processor 72 to retain SG upon power loss. When power is restored, the multifunction processor 72 transmits SG to the microcontroller 26 over the parallel communication bus 82. The microcontroller 26 then transmits SG to the demodulator 22 (shown in FIG. 3) via the demodulator gain signal, thereby setting the silicon switches connected to the demodulator gain thin film resistor network chip so as to yield the optimum value for the demodulator gain.

After transmitting SG to the multifunction processor 72, the microcontroller 26 exits the automatic tuning cycle, returning to normal operation.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A control circuit for positioning a servo device, said servo device being connected to an actuation circuit and a position detection means that generates a servo device position signal, said control circuit operating in response to a process demand signal and having automatic demodulator tuning, said control circuit comprising:

a) a demodulator having a gain, said demodulator operable to receive and respond to said servo device position signal to generate an analog position signal, said analog position signal having a lower voltage value when said servo device is at its 0% mechanical position and an upper voltage value when said servo device is at its 100% mechanical position, said lower voltage value and said upper voltage value being functions of said gain;

b) an analog to digital converter having an input voltage range, said analog to digital converter operable to convert said analog position signal to a digital position signal;

c) calculating means operable to receive and respond to said process demand signal and said digital position signal to calculate a control signal to said actuation circuit, said control signal causing said actuation circuit to move said servo device in response thereto; and d) optimum means for setting said gain to an optimum value which results in said lower voltage value of said analog position signal being within a lower voltage range and said upper voltage value of said analog position signal being within an upper voltage range, where said lower voltage range and said upper voltage range are within said input voltage range.

2. The control circuit of claim 1 wherein said calculating means further comprises:

i) means operable to receive and respond to said digital position signal and said process demand signal to generate a digital demand signal;

ii) a digital to analog converter operable to convert said digital demand signal to an analog demand signal; and iii) a controller operable to receive and respond to said analog demand signal and said analog position signal to calculate said control signal to said actuation circuit.

3. The control circuit of claim 1 wherein said lower voltage range begins with, but does not include, a minimum lower voltage value, LVmin, and extends to, and includes, a maximum lower voltage value, Vl, and said upper voltage range begins with, but does not include, a minimum upper voltage value, UVmin, and extends to, and includes, a maximum upper voltage value, Vh.

4. The control circuit of claim 3 wherein said optimum means is operable only during a tuning cycle that is initiated by a start tune signal and is terminated when said gain is set to said optimum value.

5. The control circuit of claim 4 wherein said gain for said demodulator is determinable by a gain signal for transmitting integer values in a gain range having a lower limit, DGl, and an upper limit, DGh, said integer values corresponding to real number values for said gain.

6. The control circuit of claim 5 wherein said optimum means comprises:

i) means for generating said gain signal;

ii) limit means for determining when said servo device is at its 0% mechanical position and 100% mechanical position;

iii) means for ramping said control signal down until said servo device is at its 0% mechanical position;

iv) zero percent means for determining the largest one of said integer values, SG0, for said gain signal which results in said lower voltage value of said analog position signal being within said lower voltage range;

v) means for ramping said control signal up until said servo device is at its 100% mechanical position;

vi) one hundred percent means for determining the largest one of said integer values, SG100, for said gain signal which results in said upper voltage value of said analog position signal being within said upper voltage range; and vii) means for setting said gain signal equal to one of said integer values, SG, which corresponds to said optimum value for said gain, SG being selected from SG0 and SG100, where SG100 is selected if SG100 is less than SG0 and where SG0 is selected if SG0 is less than or equal to SG100, provided SG is not less than or equal to an error gain which results in said lower voltage value of said analog position signal being greater than LVmin or said upper voltage value of said analog position signal being less than UVmin.

7. The control circuit of claim 6 wherein said input voltage range is −4.5 to +4.5 volts, Vl is −3.825 volts, Vh is +3.825 volts, LVmin is −2.25 volts and UVmin is +2.25 volts.

8. The control circuit of claim 6 wherein said zero percent means comprises:

i) a first initial value means operatively responsive to said start tune signal for setting said gain signal equal to DGl;

ii) a first increase means operatively responsive to the completion of said first initial value means for increasing said gain signal by a certain increase amount until said lower voltage value is less than Vl or said gain signal equals DGh, said gain signal having one of said integer values, CG0, at the completion of said first increase means;

iii) means within said first increase means for setting said error gain equal to said gain signal when said lower voltage value is greater than LVmin; and iv) a first set means for setting SG0 equal to CG0 minus a certain decrease amount unless:
CG0 equals DGh and CG0 is less than or equal to said error gain, or
said lower voltage value is less than Vl and CG0 is equal to DGl, or
said lower voltage value is less than Vl and CG0 minus said certain decrease amount is less than or equal to said error gain.

9. The control circuit of claim 8 wherein said one hundred percent means further comprises:

i) a second initial value means operatively responsive to the completion of said first set means for setting said gain signal equal to DGl;

ii) a second increase means operatively responsive to the completion of said second initial value means for increasing said gain signal by said certain increase amount until said upper voltage value is greater than Vh or said gain signal equals DGh, said gain signal having one of said integer values, CG100, at the completion of said second increase means;

iii) means within said second increase means for setting said error gain equal to said gain signal when said upper voltage value is less than UVmin, provided said gain signal is greater than said error gain; and iv) a second set means for setting SG100 equal to CG100 minus said certain decrease amount unless:
CG100 equals DGh and CG100 is less than or equal to said error gain, or
said upper voltage value is greater than Vh and CG100 is equal to DGl, or
said upper voltage value is greater than Vh and CG100 minus said certain decrease amount is less than or equal to said error gain.

10. The control circuit of claim 9 wherein said gain means further comprises means responsive to said zero percent means and said one hundred percent means for generating an error signal if:
CG0 equals DGh and CG0 is less than or equal to said error gain, or
said lower voltage value is less than Vl and CG0 is equal to DGl, or
said lower voltage value is less than Vl and CG0 minus said certain decrease amount is less than or equal to said error gain, or
CG100 equals DGh and CG100 is less than or equal to said error gain, or
said upper voltage value is greater than Vh and CG100 is equal to DGl, or
said upper voltage value is greater than Vh and CG100 minus said certain decrease amount is less than or equal to said error gain, or
SG is less than or equal to said error gain.

11. The control circuit of claim 9 wherein DGl is 1, DGh is 31, said certain increase amount is 1, and said certain decrease amount is 1.

12. A method for tuning a control circuit that positions a servo device in response to a process demand signal, said servo device being connected to an actuation circuit and a position detection means for generating a servo device position signal, said control circuit having:

(i) a demodulator having a gain determinable by a gain signal for transmitting integer values in a gain range having a lower limit, DGl, and an upper limit, DGh, said integer values corresponding to real number values for said gain, said demodulator operable to receive and respond to said servo device position signal to generate an analog position signal, said analog position signal having a lower voltage value when said servo device is at its 0% mechanical position and an upper voltage value when said servo device is at its 100% mechanical position, said lower voltage value and said upper voltage value being functions of said gain, (ii) an analog to digital converter having an input voltage range, said analog to digital converter operable to convert said analog position signal to a digital position signal, and (iii) calculating means operable to receive and respond to said process demand signal and said digital position signal to calculate a control signal to said actuation circuit, said control signal causing said actuation circuit to move said servo device in response thereto, said method comprising the steps of:

a) generating said gain signal;
b) ramping said control signal down until said servo device is at its 0% mechanical position;
c) determining the largest one of said integer values, SG0, for said gain signal which results in said lower voltage value of said analog position signal being within a lower voltage range which begins with, but does not include, a minimum lower voltage value, LVmin, and extends to, and includes, a maximum lower voltage value, VL, where said lower voltage range is in said input voltage range;
d) ramping said control signal up until said servo device is at its 100% mechanical position;
e) determining the largest one of said integer values, SG100, for said gain signal which results in said upper voltage value of said analog position signal being within an upper voltage range which begins with, but does not include, a minimum upper voltage value, UVmin, and extends to, and includes, a maximum upper voltage value, Vh, where said upper voltage range is in said input voltage range; and
f) setting said gain signal to one of said integer values, SG, which corresponds to an optimum value for said gain, SG being selected from SG0 and SG100, where SG100 is selected if SG100 is less than SG0 and where SG0 is selected if SG0 is less than or equal to SG100, provided SG is not less than or equal to an error gain that results in said lower voltage value of said analog position signal being greater than LVmin or said upper voltage value of said analog position signal being less than UVmin.

13. The method of claim 12 wherein said input voltage range is −4.5 volts to +4.5 volts, Vl is −3.825 volts, Vh is +3.825 volts, LVmin is −2.25 volts and UVmin is +2.25 volts.

14. The method of claim 12 wherein said step for calculating SG0 further comprises the steps of:
 i) setting said gain signal equal to DGl;
 ii) increasing said gain signal by a certain increase amount until said lower voltage value is less than Vl or said gain signal equals DGh, said gain signal having one of said integer values, CG0, at the completion of said gain signal increase step;
 iii) setting said error gain equal to said gain signal when said lower voltage value is greater than LVmin; and
 iv) setting SG0 equal to CG0 minus a certain decrease amount unless:
  CG0 equals DGh and CG0 is less than or equal to said error gain, or
  said lower voltage value is less than Vl and CG0 is equal to DGl, or said lower voltage value is less than Vl and CG0 minus said certain decrease amount is less than or equal to said error gain.

15. The method of claim 14 wherein said step for calculating SG100 further comprises the steps of:
 i) setting said gain signal equal to DGl;
 ii) increasing said gain signal by said certain increase amount until said upper voltage value is greater than Vh or said gain signal equals DGh, said gain signal having one of said integer values, CG100, at the completion of said gain signal increase step;
 iv) setting said error gain equal to said gain signal when said upper voltage value is less than UVmin, provided said gain signal is greater than said error gain; and
 v) setting SG100 equal to CG100 minus said certain decrease amount unless:
  CG100 equals DGh and CG100 is less than or equal to said error gain, or
  said upper voltage value is greater than Vh and CG100 is equal to DGl, or
  said upper voltage value is greater than Vh and CG100 minus said certain decrease amount is less than or equal to said error gain.

16. The method of claim 15 further comprising the step of generating an error signal if:
 CG0 equals DGh and CG0 is less than or equal to said error gain, or
 said lower voltage value is less than Vl and CG0 is equal to DGl, or
 said lower voltage value is less than Vl and CG0 minus said certain decrease amount is less than or equal to said error gain, or
 CG100 equals DGh and CG100 is less than or equal to said error gain, or
 said upper voltage value is greater than Vh and CG100 is equal to DGl, or
 said upper voltage value is greater than Vh and CG100 minus said certain decrease amount is less than or equal to said error gain, or
 SG is less than or equal to said error gain.

17. The method of claim 15 wherein DGl is 1, DGh is 31, said certain increase amount is 1, and said certain decrease amount is 1.

* * * * *